United States Patent
Parish et al.

(10) Patent No.: US 11,668,618 B2
(45) Date of Patent: Jun. 6, 2023

(54) APPARATUS FOR MEASURING THE PRESSURE AND FLOW RATE OF A HIGH TEMPERATURE CORROSIVE LIQUID

(71) Applicant: Flowserve Management Company, Irving, TX (US)

(72) Inventors: Paul Jeffrey Parish, Spanish Fork, UT (US); Michael P. Nelson, Lehi, UT (US)

(73) Assignee: Flowserve Pte. Ltd., Singapore (SG)

( * ) Notice: Subject to any disclaimer, the term of this patent is extended or adjusted under 35 U.S.C. 154(b) by 103 days.

(21) Appl. No.: 17/485,670

(22) Filed: Sep. 27, 2021

(65) Prior Publication Data
US 2023/0094491 A1    Mar. 30, 2023

(51) Int. Cl.
*G01F 1/34*        (2006.01)
*G01L 19/06*    (2006.01)
*G01L 7/18*        (2006.01)
*G01F 1/68*        (2006.01)

(52) U.S. Cl.
CPC ............ *G01L 19/0627* (2013.01); *G01F 1/34* (2013.01); *G01F 1/68* (2013.01); *G01L 7/18* (2013.01)

(58) Field of Classification Search
CPC ....... G01L 19/0627; G01L 7/18; G01L 7/182; G01L 7/185; G01L 7/187; G01L 7/20; G01L 7/22; G01L 9/0091; G01L 9/0092; G01L 9/0094; G01L 9/0095; G01L 9/0097
See application file for complete search history.

(56) References Cited

U.S. PATENT DOCUMENTS

| | | | |
|---|---|---|---|
| 5,207,251 A | 5/1993 | Cooks | |
| 5,241,863 A * | 9/1993 | Molnar | G01L 19/0636 73/756 |
| 5,251,148 A | 10/1993 | Haines et al. | |
| 7,254,518 B2 | 8/2007 | Eryurek | |
| 2008/0223140 A1 | 9/2008 | Broden | |

FOREIGN PATENT DOCUMENTS

| | | | |
|---|---|---|---|
| CN | 112198335 A | 1/2021 | |
| DE | 102008059403 A1 * | 6/2009 | G01D 5/145 |
| KR | 2019980026018 U | 11/2001 | |
| SE | 514025 C2 * | 12/2000 | G01L 19/0627 |

OTHER PUBLICATIONS

International Search Report & Written Opinion for PCT Application No. PCT/US2022/043345 dated Jan. 4, 2023, 13 pages.

* cited by examiner

*Primary Examiner* — Herbert K Roberts
(74) *Attorney, Agent, or Firm* — Maine Cernota & Rardin

(57) ABSTRACT

An apparatus for measuring a pressure of a corrosive or high temperature process liquid includes a pressure sensor in communication with the process liquid via a vertical tube. A buffer gas injected into the vertical tube forms a liquid/gas interface at a desired height. The buffer gas supply is then either isolated or regulated so as to cause the buffer gas pressure within the vertical tube to remain equal with the process liquid pressure. The pressure sensor indirectly measures the process liquid pressure by measuring the buffer gas pressure within the vertical tube, while remaining chemically and thermally protected from the process liquid. In embodiments, pressure measurements from a pair of gas buffered pressure sensors located upstream and downstream of a valve are combined with measurements of the process liquid temperature to determine a flow rate of the process liquid through the valve.

19 Claims, 3 Drawing Sheets

APPARATUS FOR MEASURING THE PRESSURE AND FLOW RATE OF A HIGH TEMPERATURE CORROSIVE LIQUID

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to apparatus for controlling a flow of a liquid, and more particularly, to apparatus for measuring the pressure and/or flow rate of a high temperature and/or corrosive liquid.

BACKGROUND OF THE INVENTION

When controlling the flow of a process liquid, it is often desirable to measure and monitor the temperature, pressure, and/or flow rate of the liquid. Usually, the temperature of the process liquid can be measured by applying a temperature sensor to an exterior side of a thermally conductive barrier having an interior side that is in contact with the process liquid. This approach is applicable to high temperature and/or corrosive process liquids.

However, if the flowing process liquid is at a high temperature, and/or is highly corrosive, then most conventional sensors will not be suitable for measuring the pressure and flow rate of the process liquid.

What is needed, therefore, is an apparatus and method that is able to measure the pressure and/or flow rate of a flowing high temperature and/or corrosive process liquid.

SUMMARY OF THE INVENTION

The present invention is an apparatus and method for measuring the pressure, and in embodiments also the flow rate, of a high temperature and/or corrosive process liquid. This is accomplished by connecting a pressure sensor to a process liquid conduit via a vertical tube, and by establishing, and in embodiments also regulating, a column of buffer gas in the vertical tube that isolates the pressure sensor from any corrosive effects of the process liquid. Furthermore, while the temperature of the column of buffer gas in the vertical tube approximates the temperature of the process liquid, the much lower heat capacity and thermal conductivity of the buffer gas protects the pressure sensor from being damaged by the high temperature of the process liquid.

In embodiments, the flow rate of the process liquid through a valve is determined by measuring the pressure both upstream and downstream of the valve, using gas-buffered pressure sensors connected by vertical tubes as described above. In addition, the temperature of the process liquid is measured, for example within the valve itself. According to these measurements, the flow rate can be determined according to known formulae. For example, the method that is taught in U.S. Pat. No. 5,251,148 can be applied, where U.S. Pat. No. 5,251,148 is incorporated herein in its entirety for all purposes.

A first general aspect of the present invention is a pressure measuring apparatus configured to enable measurement of a pressure of a corrosive and/or high temperature process liquid while protecting a process liquid pressure sensor from being damaged by the process liquid. The pressure measuring apparatus includes a process liquid pressure sensor in fluid communication with a process liquid conduit via a vertical tube, an interface level sensing device configured to determine a level of a liquid/gas interface within the vertical tube, a buffer gas delivery line in gas communication with the vertical tube, and a buffer gas pressure regulator configured to regulate a pressure and/or volume of the buffer gas in the buffer gas delivery line.

In embodiments, the interface level sensing device is an ultrasonic level senor.

Any of the above embodiments can further include a buffer gas isolation valve configured to isolate the buffer gas pressure regulator from the vertical tube.

In any of the above embodiments, the buffer gas isolation valve can be a normally closed valve.

Any of the above embodiments can further include a controller in signal communication with the process liquid pressure sensor and the interface level sensing device.

In any of the above embodiments, the controller can be able to control the buffer gas pressure regulator. In some of these embodiments, the controller is configured to control the buffer gas pressure regulator so as to adjust the liquid/gas interface in the vertical tube to a specified height.

Any of the above embodiments can further include a buffer gas pressure sensor in gas communication with the buffer gas delivery line.

Any of the above embodiments can further include a buffer gas temperature sensor in thermal communication with the buffer gas delivery line.

Any of the above embodiments can further include a buffer gas heater configured to heat the buffer gas before or while the buffer gas is in the buffer gas delivery line.

A second general aspect of the present invention is a flow measuring apparatus configured to enable measurement of a flow of a corrosive and/or high temperature process liquid through a valve. The flow measuring apparatus includes a pressure measuring apparatus according to the first general aspect, the pressure measuring apparatus comprising a first process liquid pressure sensor in fluid communication via a first vertical tube with the process liquid conduit on an upstream side of the valve, and a second process liquid pressure sensor in fluid communication via a second vertical tube with the process liquid conduit on a downstream side of the valve, first and second interface level sensing devices being associated respectively with the first and second vertical tubes, a process liquid temperature sensor configured to sense a temperature of the process liquid, and a controller in signal communication with the first and second process liquid pressure sensors and with the temperature sensor, the controller being configured to determine the flow rate of the process liquid through the valve according to a temperature of the process measured by the process liquid temperature sensor, and inlet and outlet pressures of the process liquid measured respectively by the first and second process liquid pressure sensors.

In embodiments, the process liquid temperature sensor is configured to measure a temperature of the process liquid within the valve.

In any of the above embodiments, the pressure measuring apparatus can include a first buffer gas isolation valve configured to isolate the buffer gas pressure regulator from the first vertical tube, and a second buffer gas isolation valve configured to isolate the buffer gas pressure regulator from the second vertical tube.

Any of the above embodiments can further include first and second buffer gas temperature sensors configured respectively to measure first and second temperatures of the buffer gas in the buffer gas delivery line at locations proximate the first and second vertical tubes, respectively.

Any of the above embodiments can further include first and second buffer gas pressure sensors configured to measure pressures of the buffer gas in the buffer gas delivery line at locations proximate the first and second process liquid pressure sensors, respectively.

A third general aspect of the present invention is a method of measuring a flow of a corrosive and/or high temperature process liquid through a valve. The method includes providing a flow measuring apparatus according to the second general aspect, injecting buffer gas into the first and second vertical tubes, causing the process liquid to flow through the process liquid conduit and through the valve, adjusting at least one buffer gas pressure regulator so as to adjust first and second liquid/gas interface levels respectively within the first and second vertical tubes, determining by the controller of the flow rate of the process liquid through the valve according to pressure and temperature measurements received by the controller from the first and second process liquid pressure sensors and the process liquid temperature sensor, and providing the determined process liquid flow rate to a user.

In embodiments, the method further includes, after the adjusting of the first and second liquid/gas interface levels, isolating the first and second vertical tubes from the buffer gas pressure regulators.

In any of the above embodiments, at least one of the buffer gas pressure regulators can remain in gas communication with at least one of the vertical tubes during the step of determining the flow rate of the process liquid.

In any of the above embodiments, the flow measuring apparatus can include only one buffer gas pressure regulator, and the first and second liquid/gas interface levels can be adjusted simultaneously by the buffer gas pressure regulator.

And in any of the above embodiments, the flow measuring apparatus can includes only one buffer gas pressure regulator, and adjusting the first and second liquid/gas interface levels can include isolating the second vertical tube from the process liquid pressure regulator while adjusting the liquid/gas interface level in the first vertical tube, and isolating the first vertical tube from the process liquid pressure regulator while adjusting the liquid/gas interface level in the second vertical tube.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for measuring the pressure, and in embodiments also the flow rate, of a high temperature and/or corrosive process liquid.

Figure 1:
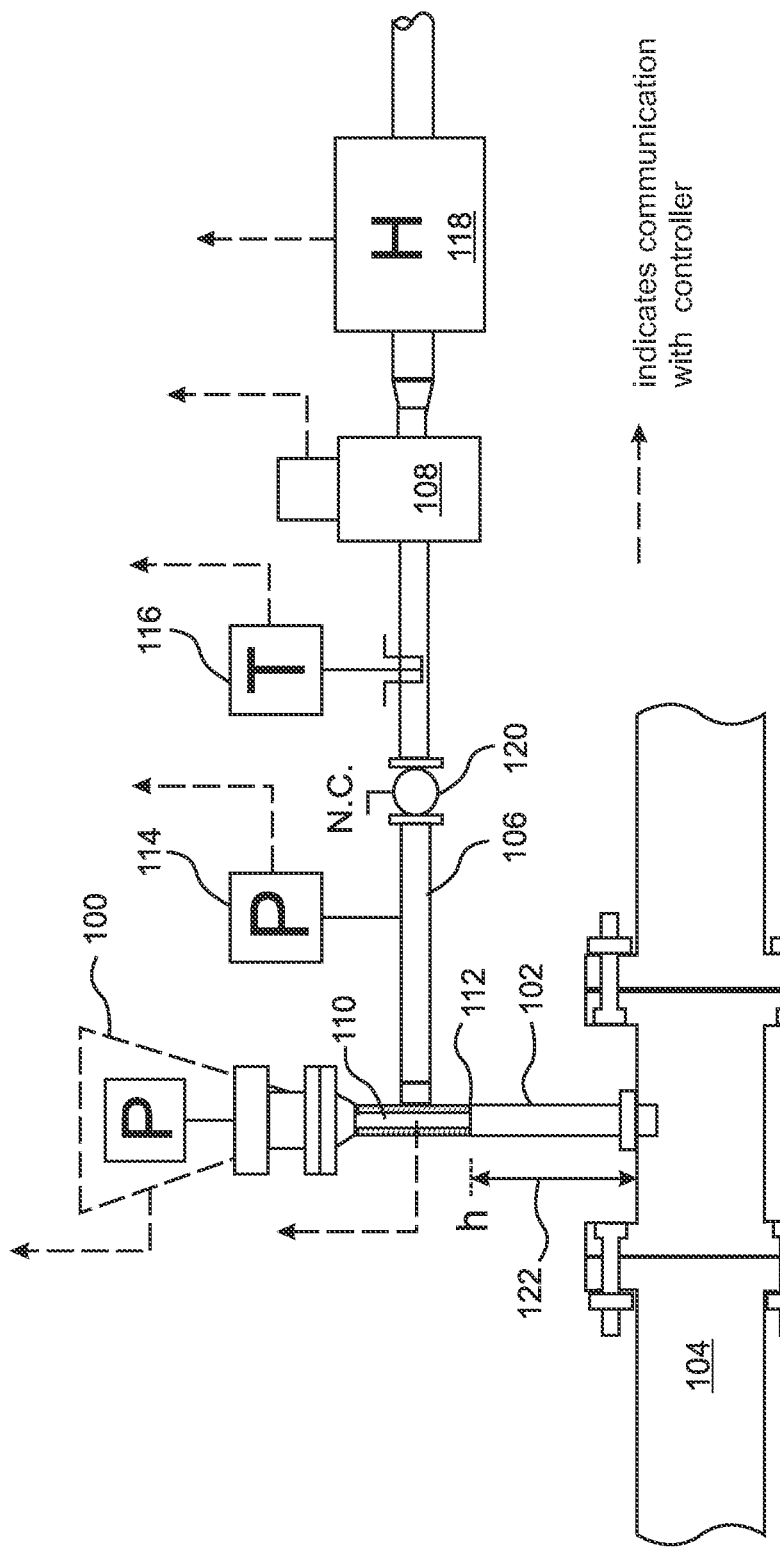
FIG. 1 is a block diagram of a gas-buffered pressure sensor according to an embodiment of the present invention.

With reference to FIG. 1, the apparatus of the present invention includes at least one process liquid pressure sensor 100 that is connected by a vertical tube 102 to a process liquid conduit 104 configured to convey a process liquid therethrough. The apparatus further comprises a buffer gas control system that includes a buffer gas delivery line 106 in gas communication with the vertical tube 102, a buffer gas pressure regulator 108, and a liquid/gas transition level sensor 110, such as an ultrasonic sensor, that is able to monitor a height 122 within the vertical tube 102 of the interface 112 between the process liquid and the buffer gas. In embodiments, the buffer gas is nitrogen gas.

In embodiments, the buffer gas control system further includes a buffer gas pressure sensor 114, a buffer gas temperature sensor 116, a buffer gas heater 118, and/or a controller (not shown) that is able to monitor the height 122 of the liquid/gas interface 112 and/or the buffer gas pressure in the vertical tube 102 as measured by the process liquid pressure sensor 100. In embodiments, the controller is further able to control the buffer gas pressure regulator, and is thereby able to regulate the pressure and/or volume of the buffer gas in the buffer gas delivery line 106, so as to adjust and regulate the height 122 of the liquid/gas interface 112 within the vertical tube. In some of these embodiments, the height 122 of the liquid gas interface 112 is regulated only during a startup phase, after which the buffer gas regulator 108 is isolated from the vertical tube 102. In other embodiments, regulation of the height 122 of the liquid/gas interface 112 continues during an operational phase that follows the startup phase.

Figure 2:
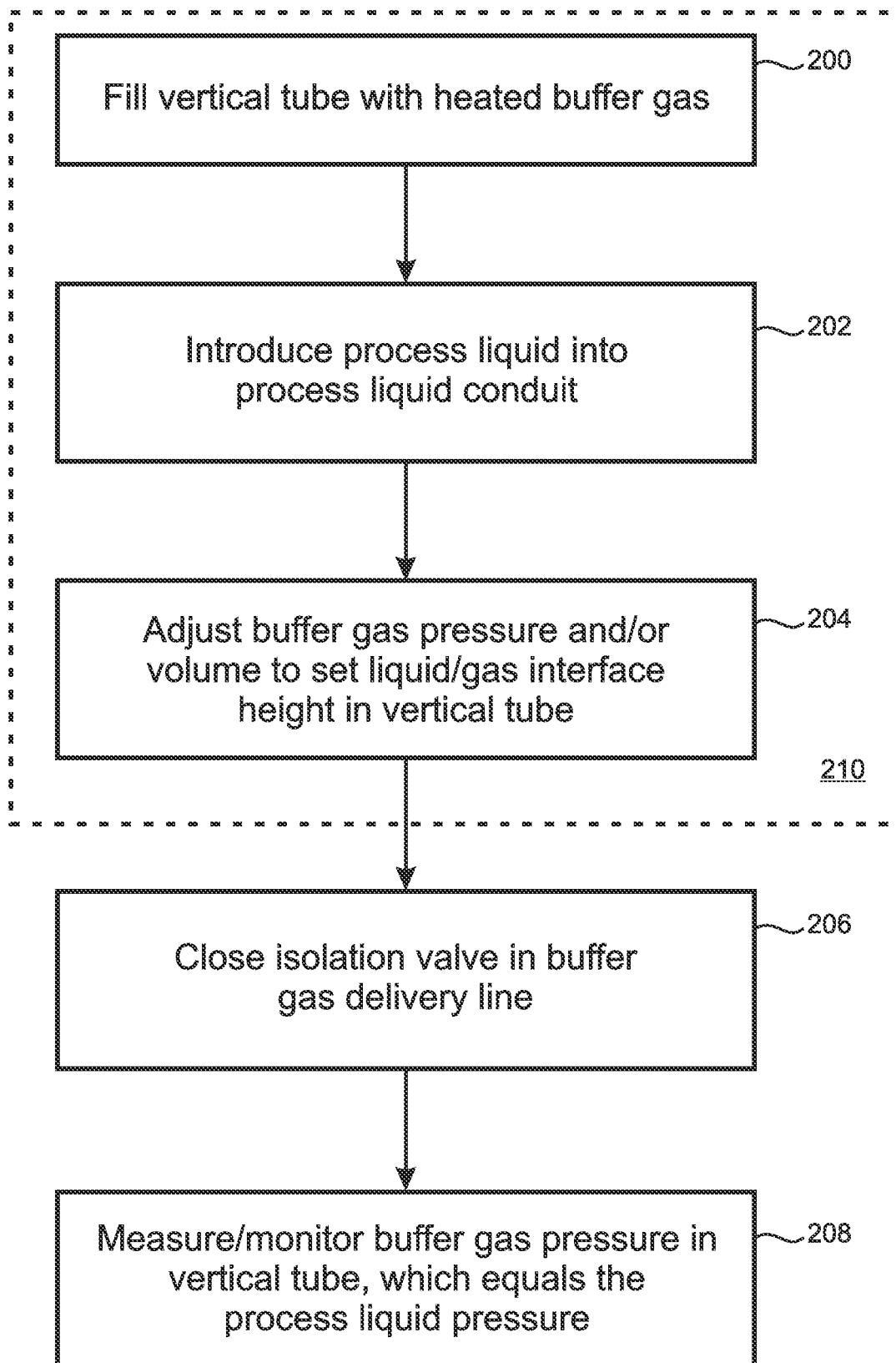
FIG. 2 is a flow diagram that illustrates a method embodiment of the invention.

With reference to FIG. 2, according to the method of the present invention, during a startup phase 210 the buffer gas delivery line is placed in gas communication with the vertical tube 102, and buffer gas is introduced 200 into the vertical tube 102.

If not already present, the process liquid is then introduced 202 into the process liquid conduit 106. The pressure and/or volume of the buffer gas is adjusted 204 using the buffer gas regulator 108 until the interface 112 between the buffer gas and the process liquid within the vertical tube 102 is established at a desired liquid/gas interface height 122, as measured by the ultrasonic sensor 110 or other liquid/gas interface measuring device. In embodiments, the buffer gas is introduced into the vertical tube during the startup phase before the process liquid begins to flow through the process liquid conduit, and the pressure and/or volume of the buffer gas is initially set to be equal to or higher than the expected pressure of the process liquid. This ensures that once the process liquid begins to flow through the process liquid conduit, it is maintained at all times at a safe distance 'from the pressure valve, including during the startup phase 210.

In the embodiment of FIG. 2, once the startup phase 210 has been completed, a "normally closed" valve 120 (labeled "N.C." in the drawing) that is provided in the buffer gas delivery line 106 is closed 206, thereby isolating the source of the buffer gas from the vertical tube 102, so that the pressure of the buffer gas in the vertical tube 102 thereafter remains equal to the pressure of the process liquid 208, even if the pressure of the process liquid fluctuates. In other embodiments, the buffer gas pressure regulator 108 remains in gas communication with the vertical tube 102 even after the end of the startup phase 210, so as to maintain the liquid/gas interface 112 at the desired height 122. So long as the interface height 122 is held constant, the buffer gas pressure within the vertical tube 102 will equal the pressure of the process liquid. The pressure sensor is thereby able to measure and monitor 208 the pressure of the process liquid by monitoring the pressure of the buffer gas in the vertical tube, while remaining thermally and chemically protected from the process liquid by the buffer gas in the vertical tube 102.

In embodiments, the startup phase 210 further includes heating the buffer gas 200 to a temperature that approximates the temperature of the process liquid, so as to ensure that the buffer gas within the vertical tube 102 quickly reaches temperature equilibrium with the process liquid, as well as pressure equilibrium.

Figure 3:
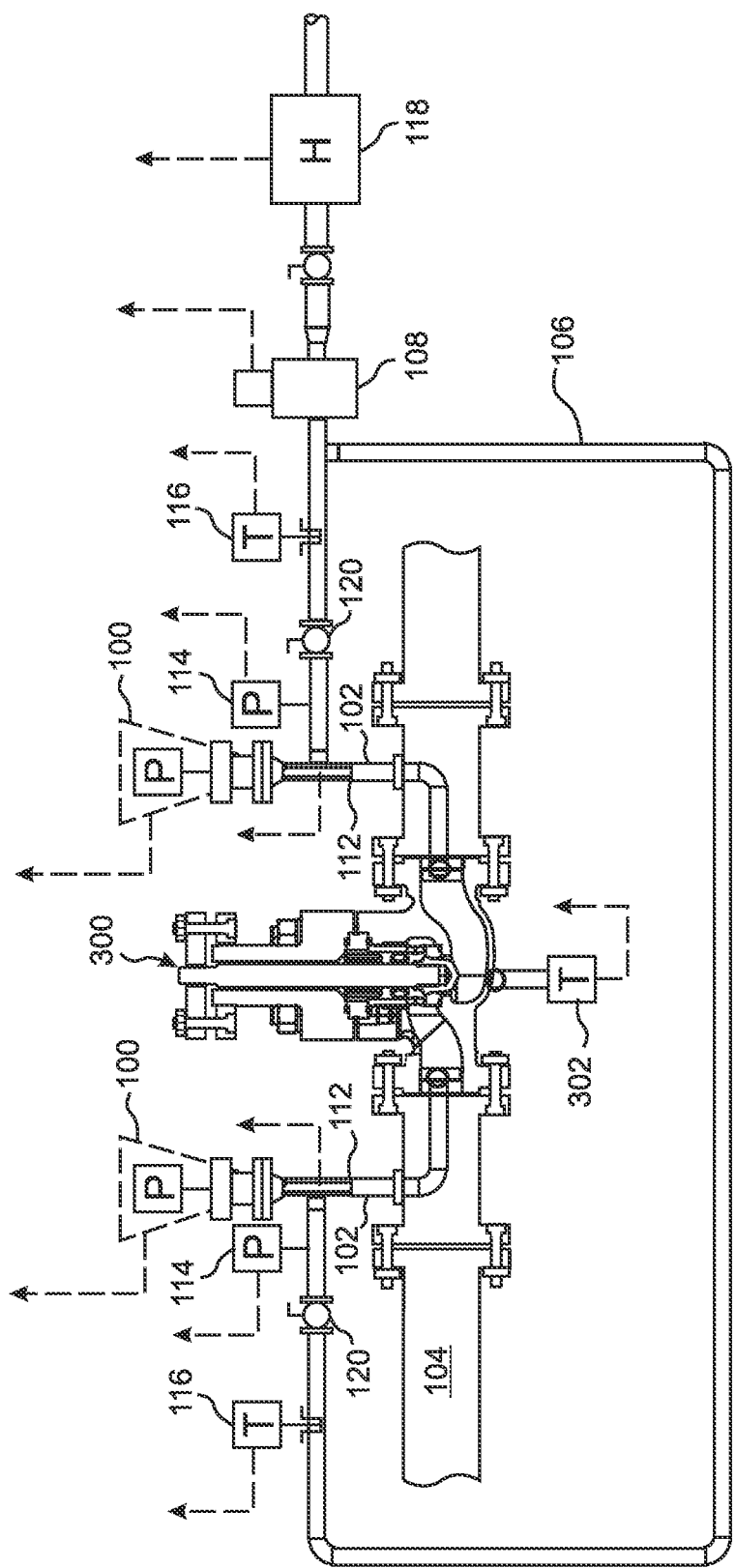
FIG. 3 is a block diagram of an embodiment of the present invention that is configured to measure the flow rate of a process liquid through a valve.

With reference to FIG. 3, in embodiments of the present invention the apparatus is configured to measure the flow rate of the process liquid through a valve 300. According to these embodiments, gas-buffered pressure sensors 100 are attached via vertical tubes 102 to the process liquid conduit 104 both upstream and downstream of the valve 300. In additional, a process liquid temperature sensor 302 is provided that is able to monitor the temperature of the process liquid. In the embodiment of FIG. 3, the process liquid temperature sensor is installed on the valve 300 itself, and is configured to measure the temperature of the process liquid as it passes through the valve 300.

Buffer gas delivery lines 106 are connected to the vertical tubes 102 of both of the pressure sensors 100. In the embodiment of FIG. 3, a single buffer gas delivery line 106 is connected to both of the vertical tubes, and a single buffer gas pressure regulator 108 is used to adjust the buffer gas pressures and/or volumes in both of the vertical tubes 102, and to thereby establish the liquid/gas interfaces 112 at desired heights 122 in the vertical tubes 102. The heights 122 of the liquid/gas interfaces 112 in the vertical tubes 102 can be adjusted simultaneously, or the normally closed isolation valves 120 can be used to isolate the buffer gas delivery line 106 in turn from one and then the other of the vertical tubes 102, so that the heights 122 of the liquid/gas interfaces 112 can be separately adjusted and optimized. In still other embodiments, separate buffer gas pressure regulators (not shown) are used to control the liquid/gas interface heights in each of the vertical tubes 102.

Once the startup phase 210 has been completed and process liquid is flowing through the valve 300, measurements reported by the two gas-buffered pressure sensors 100 and the process liquid temperature sensor 302 can then be used to calculate the flow rate of the process liquid through the valve 300, so that it can be presented to a user. In embodiments, the calculations are automatically performed by the controller or by another computing device, such that the flow rate is reported to the user in substantially real time.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A pressure measuring apparatus configured to enable measurement of a pressure of a corrosive and/or high temperature process liquid while protecting a process liquid pressure sensor from being damaged by the process liquid, the pressure measuring apparatus comprising:
   a process liquid pressure sensor in fluid communication with a process liquid conduit via a vertical tube;
   an interface level sensing device configured to determine a level of a liquid/gas interface within the vertical tube;
   a buffer gas delivery line in gas communication with the vertical tube; and
   a buffer gas pressure regulator configured to regulate a pressure and/or volume of the buffer gas in the buffer gas delivery line.

2. The pressure measuring apparatus of claim 1, wherein the interface level sensing device is an ultrasonic level senor.

3. The pressure measuring apparatus of claim 1, further comprising a buffer gas isolation valve configured to isolate the buffer gas pressure regulator from the vertical tube.

4. The pressure measuring apparatus of claim 1, further comprising a controller in signal communication with the process liquid pressure sensor and the interface level sensing device.

5. The pressure measuring apparatus of claim 4, wherein the controller is able to control the buffer gas pressure regulator.

6. The pressure measuring apparatus of claim 5, wherein the controller is configured to control the buffer gas pressure regulator so as to adjust the liquid/gas interface in the vertical tube to a specified height.

7. The pressure measuring apparatus of claim 1, further comprising a buffer gas pressure sensor in gas communication with the buffer gas delivery line.

8. The pressure measuring apparatus of claim 1, further comprising a buffer gas temperature sensor in thermal communication with the buffer gas delivery line.

9. The pressure measuring apparatus of claim 1, further comprising a buffer gas heater configured to heat the buffer gas before or while the buffer gas is in the buffer gas delivery line.

10. A flow measuring apparatus configured to enable measurement of a flow rate of a corrosive and/or high temperature process liquid flowing in a process liquid conduit through a valve, the flow measuring apparatus comprising:
    a pressure measuring apparatus comprising:
       a first process liquid pressure sensor in fluid communication via a first vertical tube with the process liquid conduit on an upstream side of the valve, and a second process liquid pressure sensor in fluid communication via a second vertical tube with the process liquid conduit on a downstream side of the valve;
       first and second interface level sensing devices associated respectively with the first and second vertical tubes;
       at least one buffer gas delivery line in gas communication with the vertical tubes; and
       at least one buffer gas pressure regulator configured to regulate pressures and/or volumes of the buffer gas in the at least one buffer gas delivery line;

at least one process liquid temperature sensor configured to sense a temperature of the process liquid; and a controller in signal communication with the first and second process liquid pressure sensors and with the at least one temperature sensor, the controller being configured to determine the flow rate of the process liquid through the valve according to a temperature of the process measured by the at least one process liquid temperature sensor, and inlet and outlet pressures of the process liquid measured respectively by the first and second process liquid pressure sensors.

11. The flow measuring apparatus of claim 10, wherein the at least one process liquid temperature sensor includes a process liquid temperature sensor that is configured to measure a temperature of the process liquid within the valve.

12. The flow measuring apparatus of claim 10, wherein:
the at least one buffer gas delivery line includes a single buffer gas delivery line in gas communication with both of the vertical tubes;
the at least one buffer gas pressure regulator includes a single buffer gas pressure regulator configured to regulate a pressure and/or a volume of the buffer gas in the single buffer gas delivery line; and
the pressure measuring apparatus comprises a first buffer gas isolation valve configured to isolate the single buffer gas pressure regulator from the first vertical tube, and a second buffer gas isolation valve configured to isolate the single buffer gas pressure regulator from the second vertical tube.

13. The flow measuring apparatus of claim 10, further comprising first and second buffer gas temperature sensors configured respectively to measure first and second temperatures of the buffer gas in the at least one buffer gas delivery line at locations proximate the first and second vertical tubes, respectively.

14. The flow measuring apparatus of claim 10, further comprising first and second buffer gas pressure sensors configured to measure pressures of the buffer gas in the at least one buffer gas delivery line at locations proximate the first and second process liquid pressure sensors, respectively.

15. A method of measuring a flow rate of a corrosive and/or high temperature process liquid through a valve, the method comprising:
providing a flow measuring apparatus according to claim 10;
injecting buffer gas into the first and second vertical tubes;
causing the process liquid to flow through the process liquid conduit and through the valve;
adjusting the at least one buffer gas pressure regulator so as to adjust first and second liquid/gas interface levels respectively within the first and second vertical tubes;
determining by the controller of the flow rate of the process liquid through the valve according to pressure and temperature measurements received by the controller from the first and second process liquid pressure sensors and the at least one process liquid temperature sensor; and
providing the determined process liquid flow rate to a user.

16. The method of claim 15, wherein the method further includes, after the adjusting of the first and second liquid/gas interface levels, isolating the first and second vertical tubes from the buffer gas pressure regulators.

17. The method of claim 15, wherein at least one of the buffer gas pressure regulators remains in gas communication with at least one of the vertical tubes during the step of determining the flow rate of the process liquid.

18. The method of claim 15, wherein the at least one buffer gas pressure regulator of the flow measuring apparatus includes only one buffer gas pressure regulator, and wherein the first and second liquid/gas interface levels are adjusted simultaneously by the buffer gas pressure regulator.

19. The method of claim 15, wherein the at least one buffer gas pressure regulator of the flow measuring apparatus includes only one buffer gas pressure regulator, and wherein adjusting the first and second liquid/gas interface levels includes isolating the second vertical tube from the process liquid pressure regulator while adjusting the liquid/gas interface level in the first vertical tube, and isolating the first vertical tube from the process liquid pressure regulator while adjusting the liquid/gas interface level in the second vertical tube.

* * * * *